United States Patent [19]

Koizumi

[11] Patent Number: 4,695,995
[45] Date of Patent: Sep. 22, 1987

[54] FRONT LOADING DISK PLAYER WITH IMPROVED DISK SENSOR POSITIONING

[75] Inventor: Toshiaki Koizumi, Saitama, Japan

[73] Assignee: Pioneer Electronic Corporation, Tokyo, Japan

[21] Appl. No.: 769,644

[22] Filed: Aug. 27, 1985

[30] Foreign Application Priority Data

Aug. 28, 1984 [JP]  Japan .................... 59-179024
Aug. 28, 1984 [JP]  Japan .................... 59-179025

[51] Int. Cl.⁴ .................................... G11B 17/04
[52] U.S. Cl. .......................... 369/75.2; 369/239; 369/267
[58] Field of Search ................ 369/75.2, 267, 239

[56] References Cited

U.S. PATENT DOCUMENTS

| | | | |
|---|---|---|---|
| 3,941,392 | 3/1976 | Grosemans et al. | 369/239 |
| 4,062,547 | 12/1977 | Dorren | 369/267 |
| 4,403,317 | 9/1983 | Suzuki et al. | 369/75.2 |
| 4,416,003 | 11/1983 | Suzuki | 369/75.2 |
| 4,564,930 | 1/1986 | Funabashi et al. | 369/75.2 |

FOREIGN PATENT DOCUMENTS 43254  3/1985  Japan .................... 369/75.2

Primary Examiner—Steven L. Stephan
Attorney, Agent, or Firm—Sughrue, Mion, Zinn, Macpeak and Seas

[57] ABSTRACT

A front loading disk player of a type capable of playing disks of different diameters wherein the diameter and proper loading of the disk can be detected at all times with a simple sensor arrangement. The inventive disk player includes a housing, a playing mechanism provided in the housing and including an optical pickup and a turntable, the turntable including a tapered wheel received in the center hole of the disk, a disk conveying mechanism for conveying disks to the playing position, and a clamping mechanism for clamping disks conveyed to the playing position against the turntable. A detector detects the fact that the disk has been clamped against the turntable. This detector further includes a sensor having a detecting point within a range defined outside the outer circumference of the turntable and inside the outer circumference of the smallest diameter disk with the center of the rotary shaft of the turntable as the center of the smallest diameter disk, the range excluding a portion encompassed by a locus of cylinders having a diameter equal to that of the smallest disk circumscribing a reading spot on a locus of reading spots of the optical pickup and being tangent to the outer circumference of the tapered wheel. Further, a second sensor may be provided for detecting the presence of disks of diameter larger than the smallest diameter, the second sensor having a detecting point disposed separately from the detecting point of the first sensor by a distance equal to or larger than the outer diameter of the smallest diameter disk.

5 Claims, 11 Drawing Figures

FRONT LOADING DISK PLAYER WITH IMPROVED DISK SENSOR POSITIONING

BACKGROUND OF THE INVENTION

The present invention generally relates to a disk player, and particularly to a front loading disk player having a disk conveying mechanism for automatically conveying a disk to a playing position.

A front loading disk player is known in which a disk on which PCM signals have been recorded is received in a player housing with the disk supported by a disk carrying portion provided in the housing, which disk carrying portion can be extended from and received in the housing. With this arrangement, the space above the upper surface of the disk player can be utilized for stacking other components and the like. Such a front loading disk player also includes a disk conveying mechanism, including the carrying portion described above, for conveying the disk to the playing position, that is, onto a turntable.

In a disk player in which disk playing operations are automatically performed, there is provided a clamping mechanism having a disk-like pressing member rotating with the turntable for performing a clamping action upon a disk conveyed to the playing position on the turntable.

In the normal clamped condition, the respective rotary centers of the turntable, the pressing member, and the disk are made coincident with one another. However, it sometimes happens that the disk is off center in the radial direction on the disk carrying surface at the disk carrying portion due to an error in the disk loading operation. When the disk is subsequently clamped in an incorrect position, correct reproduction of the recording on the disk may not be possible. This problem is especially prevalent in a front loading compatible-type player in which disks of several different diameters, such as an optical video disk having an outer diameter of about 30 cm and a compact disk having an outer diameter of about 12 cm, can be played. In such a disk player, it is difficult to detect erroneous clamping for a smallest diameter disk on a wider surface capable of receiving an optical video disk having an outer diameter of 30 cm.

To solve this problem, sensors can be arranged on the disk carrying surface to sense the position of the compact disk and detect when the disk has been correctly sandwiched between the turntable and the pressing member of the clamping mechanism so as to determine when the clamping operation has been completed. However, the use of numbers of the considerably expensive sensors required to implement this approach is not desirable because of cost considerations.

Further, in addition to this problem, it may happen that a disk having an outer diameter of 12 cm is sufficiently far out of position on the disk carrying surface that both the sensors provided for the 12 cm disk and for a 30 cm disk are actuated, in which case the control circuit for controlling the operation of the disk player erroneously judges that a 30 cm disk is present.

SUMMARY OF THE INVENTION

The present invention has been attained in view of the foregoing, and an object thereof is to provide a front loading disk player of the compatible type which has inexpensive detecting means capable of accurately detecting whether or not a disk of a smallest diameter has been correctly mounted and clamped in position for playing, which detecting means is free of misjudgement of the diameter of the mounted disk.

In accordance with the above and other objects, the invention provides a front loading disk player comprising: a housing; playing means provided in the housing and including an optical pickup mechanism and a turntable provided with a tapered wheel adapted to be received in a center hole of a disk; a disk conveying mechanism for conveying a disk to a playing position and having a disk carrying portion capable of carrying disks of different outer diameters and adapted to be projected out of and received in the housing; a clamping mechanism for clamping a disk conveyed to the playing position in cooperation with the turntable; and detecting means for detecting when the disk has been correctly clamped, the detector means being provided with a sensor for detecting the presence of a smallest diameter disk, the sensor having a detecting point disposed within a range outside the outer circumference of the turntable and inside the outer circumference of the smallest diameter disk with the center of a rotary shaft of the turntable as the rotational center of the smallest diameter disk, with the range excluding a portion encompassed by cylinders circumscribing a locus of a reading spot of the optical pickup as well as being tangent to the outer circumference of the tapered wheel.

Still further, in accordance with another aspect of the present invention, the detector means is provided with a first sensor for detecting the presence of a smallest diameter disk and a second sensor for detecting the presence of a disk of diameter other than the smallest diameter, the first sensor having a detecting point disposed within a range outside the outer circumference of the turntable and inside the outer circumference of the smallest diameter disk with the center of the rotary shaft of the turntable as the center of the smallest diameter disk, with the region excluding the portion encompassed by cylinders circumscribing the locus of the reading spot of the optical pickup as well as being tangent to the outer circumference of the tapered wheel, and the second sensor having a detecting point disposed separately from the detecting point of the first sensor by a distance equal to or larger than the outer diameter of the smallest diameter disk.

DESCRIPTION OF THE PREFERRED EMBODIMENTS

Figure 1:
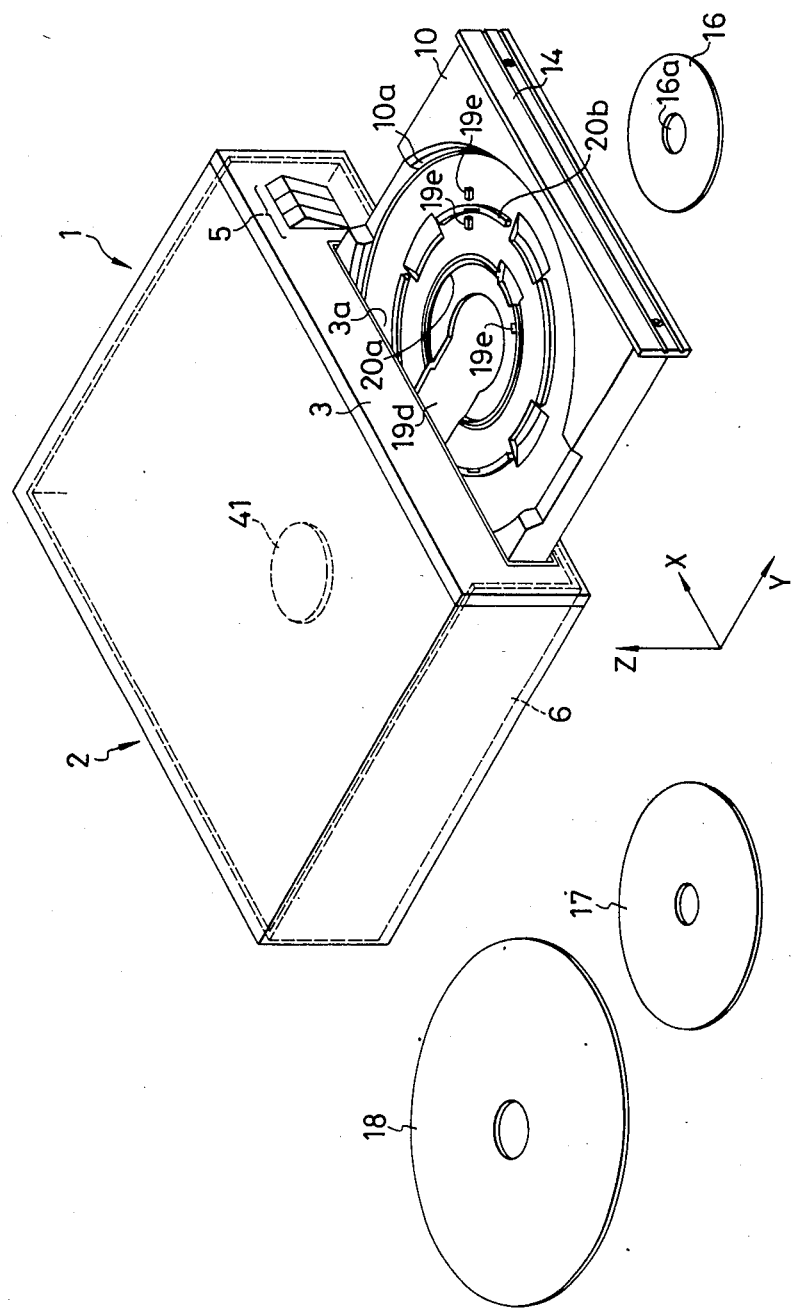
FIG. 1 is a schematic perspective diagram showing the overall arrangement of a front loading disk player constructed according to the present invention.

Referring to the accompanying drawings, a preferred embodiment of a front loading disk player constructed according to the present invention will be described hereunder.

In the drawings, reference numeral 1 generally designates a front loading disk player. The front loading disk player is a compatible player capable of reproducing three kinds of optically recorded disks, namely, a compact disk of about a 5 inch outer diameter, and video disks of 8 inch and 12 inch outer diameters.

Figure 2:
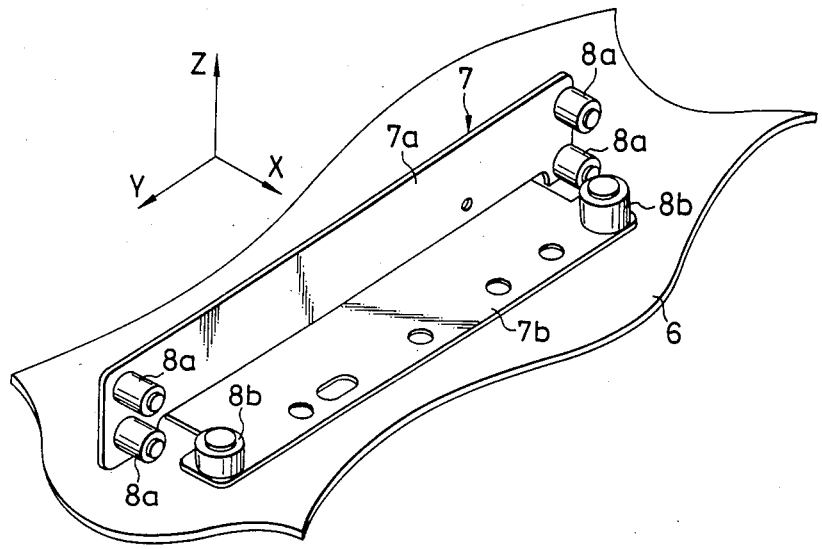
FIGS. 2 to 9 are detailed views showing various components constituting the front loading disk player.
Figure 3:
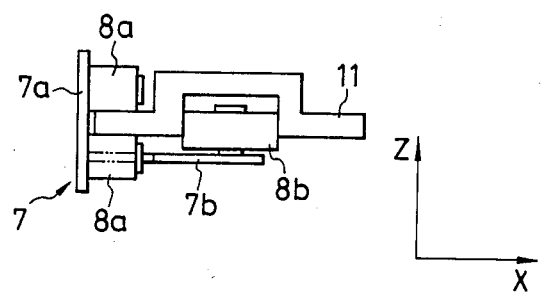
Figure 4:
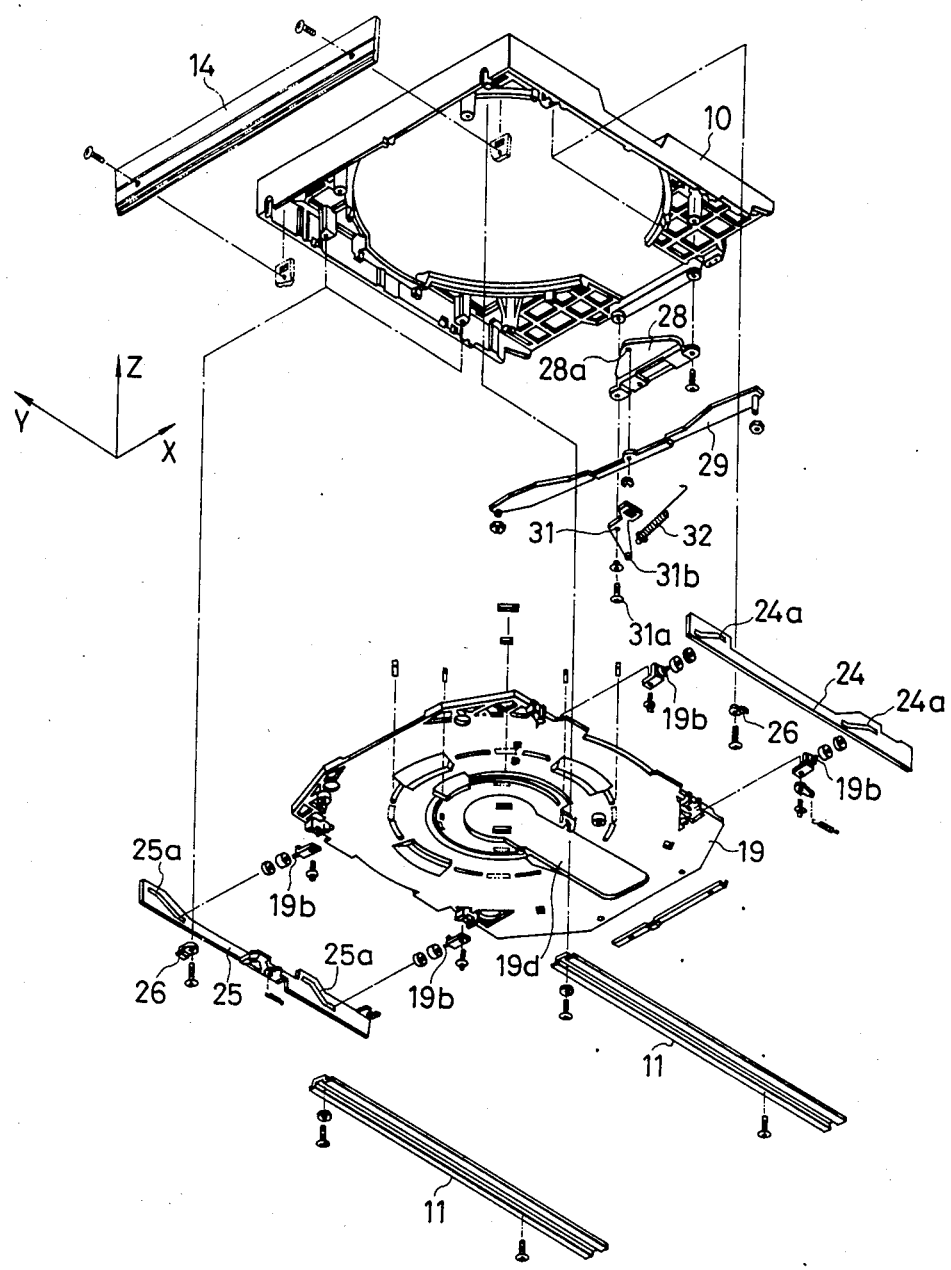
Figure 5:
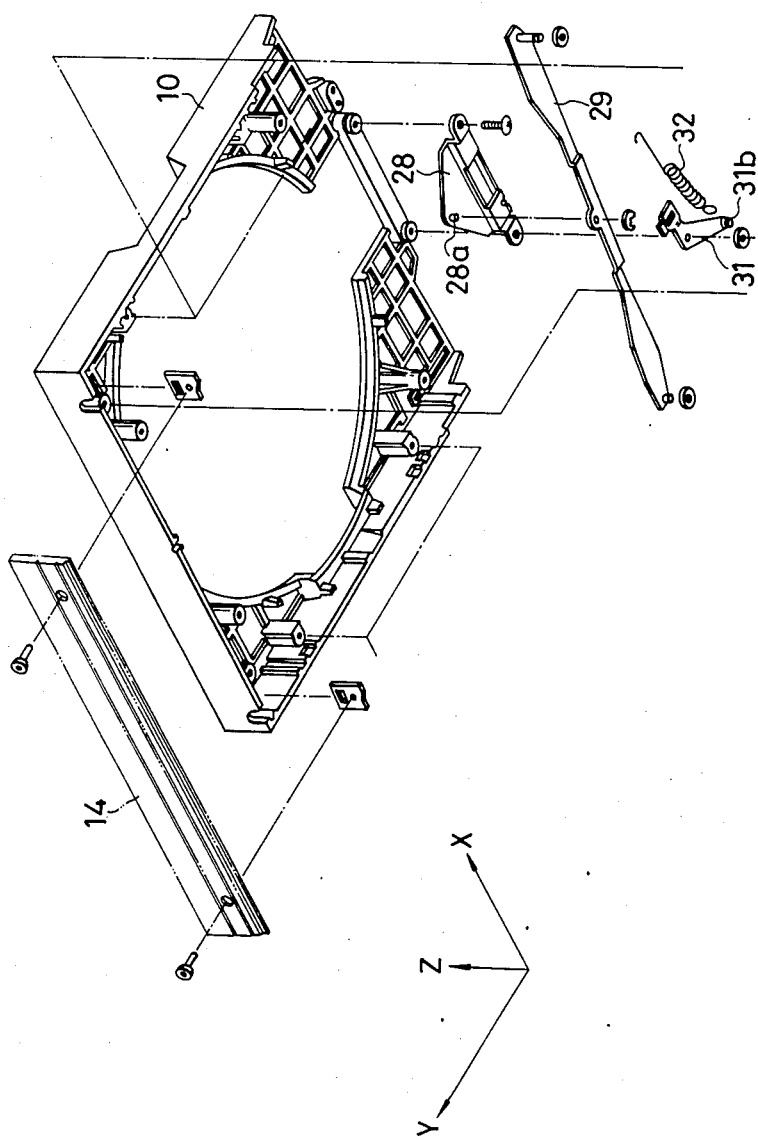
Figure 6:
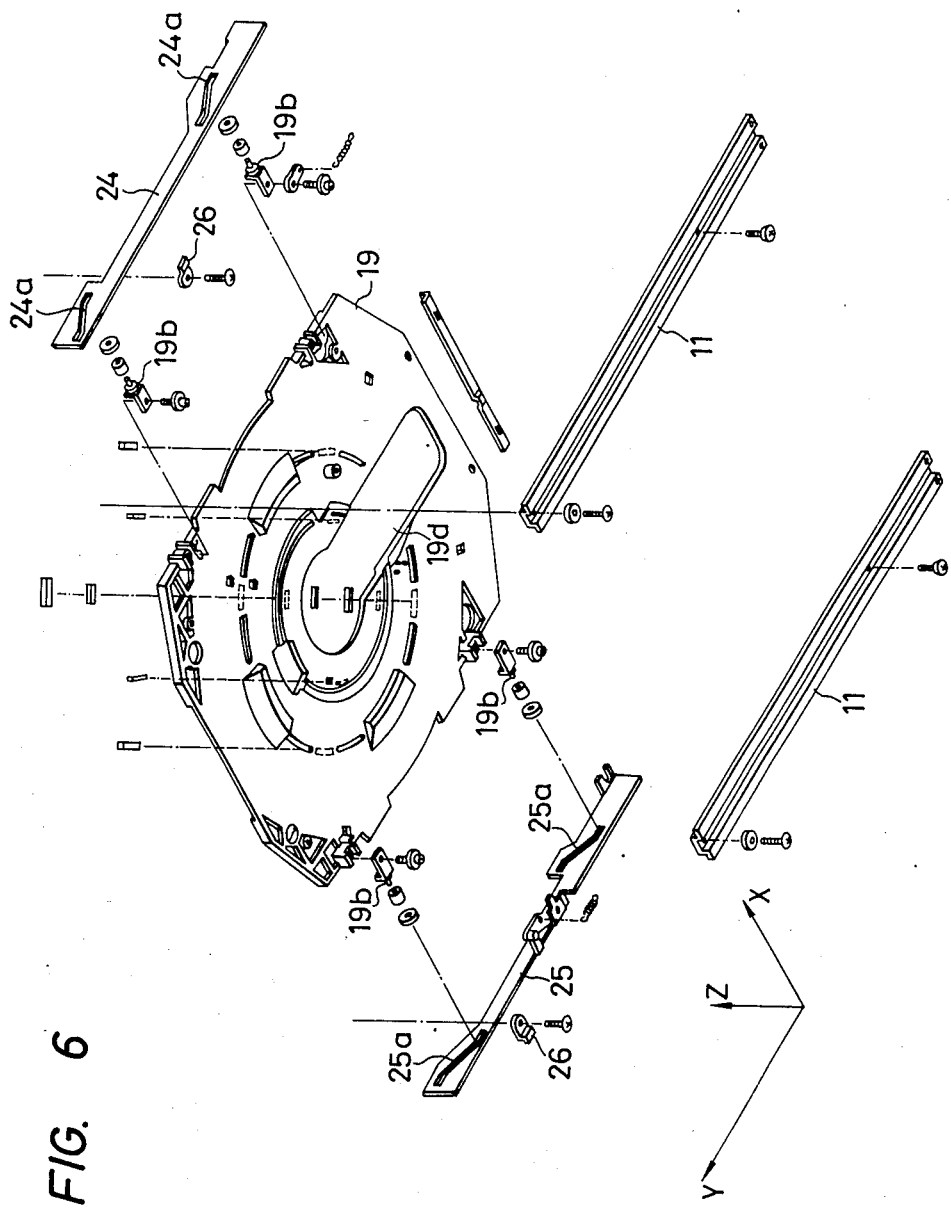

As shown in FIG. 1, a rectangular opening 3a extending in the left/right direction is formed in a front panel 3 of a housing 2 through which a disk carrying portion 5 (described later) can be projected from the housing. (The term "left/right direction" means the forward direction indicated by an arrow Y in FIG. 1; the arrows X and Z in the drawing indicate the left and up directions, respectively.) A group of operating buttons 5 for operating the disk player is provided on the front panel 3. In the housing body, there is fixedly provided a chassis 6, made of worked steel plate, which constitutes a part of the housing 2. As shown in FIGS. 2 and 3, a roller supporting member 7, extending in the front/rear direction, is fixedly provided on the chassis 6 at each of the left and right sides. However, only the left roller supporting member is shown in the drawings. Each roller supporting member 7 is formed by bending a steel plate into an L shape. A pair of horizontal rollers 8a are rotatably provided at each of the front and rear ends of the vertical portion 7a of the supporting member 7, and a vertical roller 8b is rotatably provided at each of the front and rear ends of the horizontal portion 7b of the supporting member 7. The disk carrying portion is supported movably in the front/rear direction by the respective rollers 8a and 8b. Particularly, as shown in FIGS. 4 to 6, the disk carrying portion is generally formed as a rectangular plate and is provided with a tray 10, which is electrically conductive over a part or the whole thereof. A pair of guide rails 11, made of a conductive material, attached to the under surface of the tray 10, and extending in the front/rear direction, are slidably engaged with the horizontal rollers 8a and the vertical rollers 8b (see FIG. 3).

Among the horizontal rollers 8a and the vertical rollers 8b, for example, the horizontal rollers 8a are made of a conductive material. A style panel 14, made of a conductive sintered metal, is attached to the front end of the tray 10 so as to be fitted to the opening portion 3a of the front panel 3 to close the same. The connecting structure constituted by the roller supporting member 7, the horizontal rollers 8a, and the guide rails 11 electrically connects the tray 10, the style panel 14, and the chassis 6, which constitute the disk carrying portion, with each other, independently of the position of the disk carrying portion.

As shown in FIG. 4, for example, a container 19 capable of projecting out of the housing 2 together with the tray and capable of carrying disks 16, 17 and 18 (see FIG. 1) of different outer diameters is vertically movably provided on the tray 10. The container 19 constitutes the disk carrying portion together with the tray 10. The optical disks 16, 17 and 18 have outer diameters of, for instance, about 5 inches, 8 inches, and 12 inches.

Figure 7:
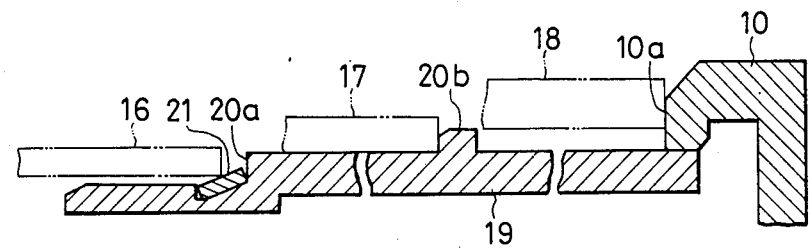

As shown in FIGS. 1 and 7, the container 19 is formed with a step portion 20a for positioning the smallest diameter disk 16 and a projection 20b for positioning the 8-inch disk 17. Further, the 12-inch disk 18 is positioned by a circular hole 10a formed in the tray 10. On a disk carrying surface for carrying the smallest diameter disk 16 in the vicinity of the step portion 20a, four support portions 21 made of rubber or the like are provided so as to project from the disk carrying surface. The four support portions 21 are provided for supporting the outer circumferential end portion of the smallest diameter disk 16, namely, a part thereof on which information is not recorded. The support portions 21, however, are not shown in FIG. 1. The disk supporting surface of each of the support portions 21 is a ramp-like surface for supporting the outer circumferential edge portion of the smallest diameter disk 16. By providing such a ramp-like surface, each of the supporting portions 21 and the outer circumferential end portion of the disk are made to be substantially in point contact so that the recording surface of the disk is completely protected.

As shown in FIGS. 4 to 6, a pair of cam members 24 and 25 are provided which are movable in the front-/rear direction through supporting members 26 attached to the inner wall on the left and right sides of the tray 10. The cam members 24 and 25 are respectively formed with cam holes 24a and 25a, each slidably engaging with a pair of engaging pins 19b fixed to the container 19. Each of the cam holes 24a is provided with a tapered portion slanting upwardly from front to rear, and each of the cam holes 25a is provided with a tapered portion slanting downwardly from front to rear. Therefore, when the two cam members 24 and 25 move in directions opposite to each other, the container 19 moves vertically.

A bracket 28 is fixed with screws to the rear end of the tray 10, and a vertically extending supporting shaft 28a is projects from the bracket 28. A swing lever 29 with its opposite ends pivoted to the respective rear ends of the cam members 24 and 25 is attached to the supporting shaft 28a in such a manner as to be swingable in a predetermined range. A link mechanism for linking the left and right cam members 24 and 25 with each other is constituted by the bracket 28 and the swing lever 29. An eject lever 31, provided in the vicinity of the bracket 28, is swingably attached to the tray 10 with a screw 31a. A pin 31b, provided at the swinging end portion of the eject layer 31, can be abutted against the rear end inner wall surface of the housing 2. The eject lever 31 is urged by a coil spring 32 in such a direction that the swing end, that is the pin 31b, approaches the rear end inner wall surface of the housing 2.

Though not shown in the drawing, a driving force providing device for applying a driving force to the right cam member 25 to cause it to move in the front-/rear direction in the right side is provided at the right end of the chassis 6. At the front end of the chassis 6, there is provided an inhibiting structure for preventing the disk carrying portion from moving toward the housing 2 when the disk carrying portion constituted by the tray 10 and the container 19 is received in the housing 2.

A disk conveying mechanism for conveying a disk to the playing position is constituted by the disk carrying portion, the cam members 24 and 25, the driving force providing device for applying a driving force to the cam member 25, the link mechanism for linking the cam members with each other, and the inhibiting structure.

Figure 8:
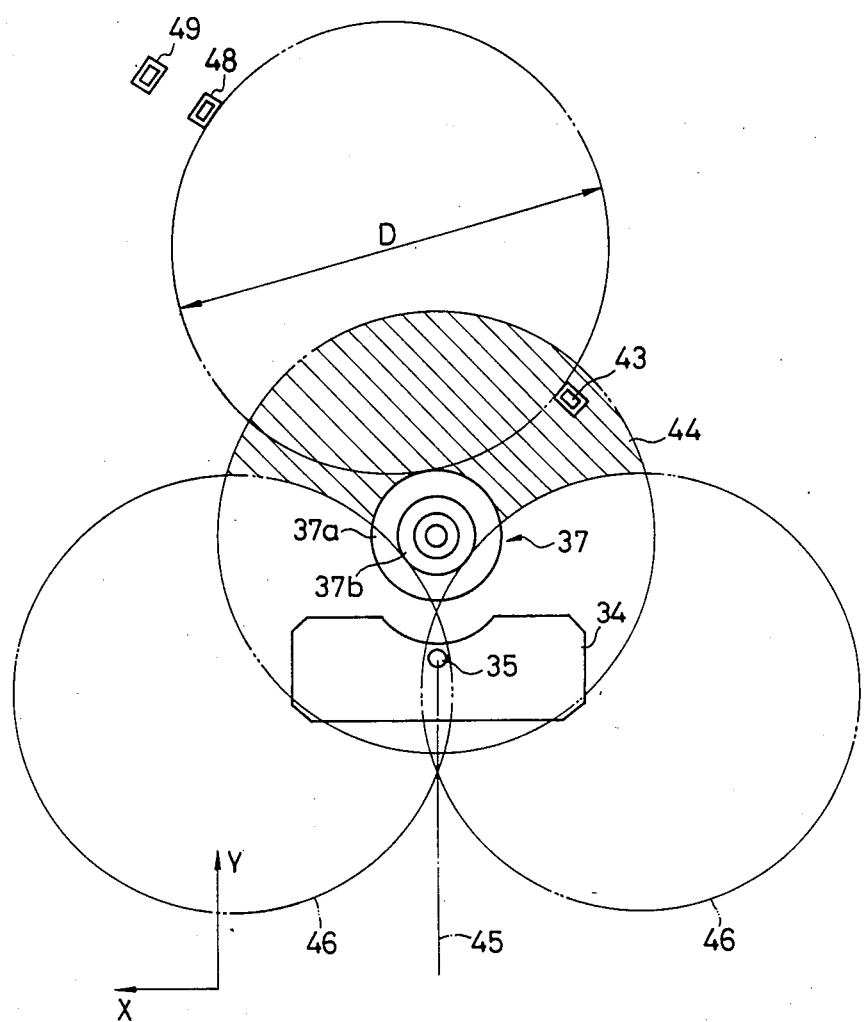
Figure 9:
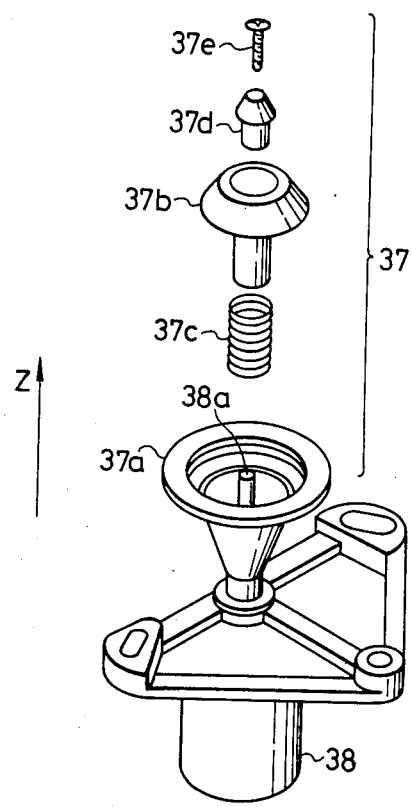

As shown in FIG. 8, a carriage 34, provided on the under surface of the chassis 6, is slidably supported by a guide shaft (not shown) fixed to the chassis 6 and extending in the front/rear direction. An optical pickup mechanism (partially illustrated), provided with an objective lens 35 for reading out information from a disk, is incorporated in the carriage 34. Although not shown in the drawings, a driving mechanism for driving the carriage 34 is provided at the side of the carriage 34. Referring back to FIGS. 1, 4 and 6, an opening portion 19d formed in the container 19 is constructed so as not to prevent the pickup mechanism from reading out information from a disk being played. A turntable 37, shown in FIG. 8 and also in FIG. 9, is provided on a line along which the carriage 34 moves. The turntable 37, rotatably driven by a spindle motor 38, is provided for carrying and rotating the smallest diameter disk 16. Besides the turntable 37, there are provided turntables (not shown) and spindle motors (not shown) for an 8-inch disk 17 and a 12-inch disk 18. As best seen in FIG. 9, the turntable 37 is constituted by a substantially plate-like disk mount portion 37a attached to an output shaft 38a of the spindle motor 38, a tapered wheel 37b slidably mounted on the output shaft 38a, a coil spring 37c for applying an upward bias force to the tapered wheel 37b, and a screw 37e. The tapered wheel 37b is formed at its upper end circumference with a tapered portion size to be received in the center hole 16a of a disk 16 (FIG. 1) so as to center the disk 16.

A playing mechanism is constituted by the carriage 34 provided with the optical pickup mechanism (including the lens 35), the turntable 37, the spindle motor 38, the turntables and the spindle motors for the disks 17 and 18, and peripheral components associated with the above-mentioned elements.

As shown in FIG. 1, a disk-like pressing member 41 is provided in the housing at a position just above the turntable 37. The pressing member 41, provided for clamping disks against the appropriate turntable for the disk, is rotatably supported by a supporting mechanism (not shown) provided in the housing 2. A clamp mechanism for clamping a disk conveyed to the playing position, that is, on the turntable, is constituted by the pressing member 41 and the supporting mechanism. The clamping operation is performed, for example, by the attractive force of a magnet provided at the pressing member 41 side. For this purpose, the turntable is made of a magnetic material.

As shown in FIG. 8, a disk sensor 43 is provided in the vicinity of the turntable 37 in the housing 2. The sensor 43 is constituted, for example, by a light sensor for detecting the presence of the smallest diameter disk 16. The position where the sensor 43 is provided is limited to locations within a hatched range 44 in FIG. 8. That is, the range 44 is outside the outer circumference of the turntable 37 (i.e. the disk mount portion 37a) and inside the outer circumference of the smallest diameter disk 16 with the center of a rotary shaft of the turntable 37 as the center of the smallest diameter disk, and further the region excludes portions encircled by a locus of cylinders 46 having a diameter equal to that of said smallest disk as well as circumscribing a reading spot on a locus 45 of reading spots of the optical pickup mechanism and being tangent to the outer circumference of the tapered wheel 37b, as shown in FIG. 8. However, the reading spot has a certain width, and therefore the locus 45 has in fact a width equal to that of the reading spot.

A control circuit provided for controlling the operation of the disk player senses the position of the smallest diameter disk 16 using the output of the sensor 43 and the reading spot of the optical pickup mechanism. By mounting the sensor 43 within the range described above, it is made possible to accurately detect the position of the smallest diameter disk 16 on the wider disk carrying surface provided in the container 19 only by using a single sensor and the reading spot.

Although not shown in the drawings, another sensor for detecting when a disk has been sandwiched between the pressing member 41 of the clamp mechanism and the turntable is provided in the housing 2 in addition to the sensor 43. This other sensor is actuated by engagement with a part of the supporting mechanism for supporting the pressing member when the pressing member 41 comes down to clamp the disk.

When the presence of the smallest diameter disk 16 has been detected by the sensor 43 and the reading spot and the fact that the pressing member 41 has reached the position to clamp the disk has been detected by the other (not shown) sensor, the control circuit determines that the clamping operation has been completed and then makes the playing mechanism ready for playing the disks.

As shown in FIG. 8, two other sensors 48 and 49 are provided at the left forward portion of the sensor 43. This pair of the sensors is used for detecting the presence of the 9-inch disk 17 and the 12-inch disk 18. The detection of completion of clamping by the sensors 48 and 49 is performed in the same manner as in the case of the sensor 43 for the smallest diameter disk. Further, the sensors 48 and 49 are also light sensors, and the light emitted from the respective sensors 43, 48, and 49 is irradiated onto the disk being loaded through a small opening 19e formed in the container 19 (FIG. 1).

As shown in FIG. 8, the detection point of the sensor 43 is separated from the detection points of the sensors 48 and 49 by a distance equal to or larger than the outer diameter D of the smallest diameter disk 16. Thus, even if a smallest-diameter disk 16 is out of place, the disk can never block the light paths of two of the sensors, for example, the sensors 43 and 48. That is, it can never happen that the control circuit determines that an 8-inch disk 17 or 12-inch disk 18 has been mounted when in fact a smallest diameter disk 16 is in fact present.

Next, the operation of the thus-arranged front loading disk player will be briefly described along with an explanation of the playing procedure.

First, when the eject button (among the operating buttons 5 shown in FIG. 1) is depressed, the locked state of the disk carrying portion (constituted by the tray 10 and the container 19) to the housing 2 is released. Accordingly, the disk carrying portion is pushed forwardly, for example, by the action of the eject lever 31 and the coil spring 32, as shown in FIG. 4. Then, the tray 10 can be drawn out manually.

As shown in FIG. 1, assuming that, for example, a smallest diameter disk 16 is carried by the tray 10 and the container 19 is projected outside of the housing 2, after the disk 16 has been carried, the disk carrying portion including the tray 10 is received in the housing 2 by being pushed manually. Then, the disk carrying portion is locked again to the housing 2 by the above-mentioned inhibiting structure. At the same time, for example, the cam member 25 shown in FIG. 4 is driven forwardly so that the left cam member 24 is moved backwardly by action of the swing lever 29. Accordingly, the container 19 descends and the disk 16 is mounted on the turntable.

As the container 19 moves, the clamp mechanism also operates to perform disk clamping. Then, upon depressing the play button (among the operating buttons 5), the carriage 34 (shown in FIG. 8) and the turntable 37 start to operate to start playing of the disk.

When the playing of the disk is finished, the carriage 34 and the turntable 37 are stopped. Then, the container 19 is made to rise.

Playing of the 8-inch and 12-inch disks 17 and 18 is also performed in the same manner as that described above.

Figure 10A:
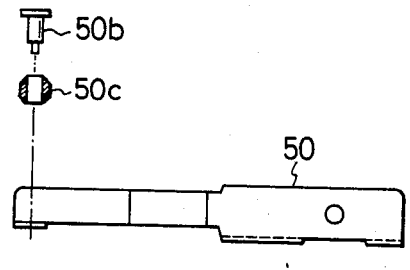
FIGS. 10A and 10B are diagrams showing an alternate embodiment of the invention.
Figure 10B:

Although the chassis 6 and the conductive member of the disk carrying portion are electrically connected by the horizontal rollers 8a or the like with the conductive guide rails 11, the invention is not limited to this arrangement. For example, an arrangement may be employed in which an elastic conductive wire or conductive spring is interposed between the conductive member of the disk carrying portion and the chassis 6. Alternatively, a conductive plate spring 50a, as shown in FIGS. 10A and 10B may be attached in the form of a cantilever to the roller supporting member 7 shown in FIG. 2, and a conductive pin 50b and a conductive roller 50c are further provided at the free end of the plate spring 50a. The roller 50c rolls on the guide rails 11. Moreover, the free end of the spring plate 50a can be bent in the form of a curved surface with the pin 50b and the roller 50c being mounted at positions not on the curved surface and the curved surface made to contact the guide rails 11.

In the front loading disk player according to the present invention as described above in detail, there is provided the sensor for detecting the presence of smallest diameter disk on the disk carrying portion (part of the disk conveying mechanism), the sensor being disposed within a range outside the outer circumference of the turntable at the upper end of the turntable and inside the outer circumference of the smallest diameter disk with the center of the rotary shaft of the turntable as the center of the smallest diameter disk, with this region excluding the portion encircled by cylinders circumscribing the locus of the reading spot of the optical pickup mechanism as well as the outer circumference of the tapered wheel. By disposing the sensor within such a range, the position of the smallest diameter disk on the wider disk carrying surface at the disk carrying portion can always be accurately detected with the single sensor and the reading spot. Furthermore, the completion of clamping the smallest diameter disk or the occurrence of erroneous clamping of the same is detected by providing another sensor for detecting when the minimum diameter disk has been sandwiched between the turntable and the disk-like pressing member of the clamping mechanism.

As described above, the position of the smallest diameter disk on the wider disk carrying surface is accurately detected with a single sensor, that is, without the large numbers of sensors employed in prior art arrangements, as a result of which the cost of the device can be easily reduced.

Further in accordance with other aspects of the present invention, there is provided a front loading disk player including a first sensor for detecting the presence of a smallest diameter disk on the disk carrying portion, the first sensor being disposed within a range outside the outer circumference of the turntable and inside the outer circumference of the smallest diameter disk with the center of a rotary shaft of the turntable as the center of the smallest diameter disk, with the range excluding the portion encircled by cylinders circumscribing the locus of the reading spot of the optical pickup and being tangent to the outer circumference of the tapered wheel, and the second sensor having a detecting point disposed separately from the detecting point of the first sensor by a distance equal to or larger than the outer diameter of the smallest diameter disk. By disposing the first sensor within such a range, the position of the smallest diameter disk on the wider disk carrying surface at the disk carrying portion can be accurately sensed by the single first sensor and the reading spot. Accordingly, the completion of the clamping of the smallest diameter disk or the occurrence of erroneous clamping of the same is detected by providing, in addition to the foregoing first sensor, another sensor for detecting the fact that the smallest diameter disk has been sandwiched between the turntable and the disk-like pressing member of the clamping mechanism.

Because the second sensor for detecting the presence of disks other than a smallest diameter disk is separated from the first sensor by a distance equal to or larger than the outer diameter of the smallest diameter disk, if a smallest diameter disk is out of place on the disk carrying portion, the first and second sensors are never actuated in response to the presence of the smallest diameter disk, and hence no erroneous judgement occurs as to the disk diameter.

I claim:

1. A front loading disk player comprising: a housing (2); playing means provided in said housing including an optical pickup and a turntable (37), said turntable comprising a tapered wheel (37b) sized to be received in a center hole of a disk; a disk conveying mechanism for conveying a disk to a playing position, said disk conveying mechanism comprising a disk carrying portion (10,19) capable of carrying any one of a plurality of disks (16,17,18) of different outer diameters; means for selectively projecting said disk carrying portion out of said housing and retracting said disk carrying portion into said housing; a clamping mechanism for clamping a disk conveyed to said playing position against said turntable; and detecting means for detecting when said disk has been clamped in said playing position against said turntable, said detecting means comprising a reading spot of said optical pickup and a smallest disk sensor (43) for detecting the presence of a smallest diameter disk, said smallest disk sensor having a detecting point disposed within a range (44) outside an outer circumference of said smallest diameter disk (16) with a center of a rotary shaft of said turntable as a center of said smallest diameter disk, and said range excluding a portion encompassed by a locus of cylinders (46) having diameters which are equal to the diameter of said smallest disk, said cylinders circumscribing the reading spot on a locus (45) of reading spots of said optical pickup and being tangent to said outer circumference of said tapered wheel.

2. The front loading disk player of claim 1, further comprising another sensor for detecting the presence of a second disk having a diameter different from the diameter of said smallest disk.

3. A front loading disk player comprising: a housing; playing means provided in said housing including an optical pickup and a turntable, said turntable comprising a tapered wheel sized to be received in a center hole of a disk; a disk conveying mechanism for conveying a disk to a playing position, said disk conveying mechanism comprising a disk carrying portion capable of carrying any one of a plurality of disks of different outer diameters; means for selectively projecting said disk carrying portion out of said housing and retracting said disk carrying portion into said housing; a clamping mechanism for clamping a disk conveyed to said playing position against said turntable; and detecting means for detecting when said disk has been clamped in said playing position against said turntable, said detecting means comprising a reading spot of said optical pickup and a first sensor for detecting the presence of a smallest diameter disk and a second sensor for detecting the presence of a disk other than said smallest diameter disk, said first sensor having a detecting point disposed within a range outside an outer circumference of said turntable and inside an outer circumference of said smallest diameter disk with a center of a rotary shaft of said turntable as a center of said smallest diameter disk, and said range excluding a portion encompassed by a locus of cylinders having diameters which are equal to the diameter of said smallest disk, said cylinders circumscribing the reading spot on a locus of reading spots of said optical pickup and being tangent to said outer circumference of said tapered wheel, and said second sensor having a detecting point disposed separately from said detecting point of said first sensor by a distance equal to or larger than said outer diameter of said smallest diameter disk.

4. The front loading disk player of claim 3, wherein said second sensor (48,49) comprises separate sensors for detecting the presence of two different disks of different respective diameters, different from said smallest diameter.

5. The front loading disk player of claim 3, wherein said second sensor comprises two separate sensors for detecting the presence of two different disks of different respective diameters which are each different from the diameter of said smallest diameter disk and each disposed separately from said detecting point of said first sensor by a distance at least equal to said outer diameter of said smallest diameter disk.

* * * * *